US012505662B2

(12) United States Patent
Chen et al.

(10) Patent No.: US 12,505,662 B2
(45) Date of Patent: Dec. 23, 2025

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Tsewei Chen, Tokyo (JP); Masami Kato, Kanagawa (JP); Tadayuki Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 18/449,200

(22) Filed: Aug. 14, 2023

(65) Prior Publication Data

US 2024/0071068 A1 Feb. 29, 2024

(30) Foreign Application Priority Data

Aug. 16, 2022 (JP) ................. 2022-129651

(51) Int. Cl.
*G06V 10/82* (2022.01)
*G06V 10/77* (2022.01)

(52) U.S. Cl.
CPC .............. *G06V 10/82* (2022.01); *G06V 10/77* (2022.01)

(58) Field of Classification Search
CPC ................ G06V 10/82; G06V 10/77
See application file for complete search history.

(56) References Cited

U.S. PATENT DOCUMENTS

| 10,474,430 | B2 | 11/2019 | Diril |
| 2020/0111235 | A1 | 4/2020 | Chen |
| 2020/0371805 | A1* | 11/2020 | Lutz ...................... G06F 7/4876 |
| 2024/0428061 | A1* | 12/2024 | Awamura ........... G11C 13/0007 |

FOREIGN PATENT DOCUMENTS

EP 3633559 A1 4/2020

OTHER PUBLICATIONS

Ankur Agrawal, et al., "9.1 A 7nm 4-Core AI Chip with 25.6 TFLOPS Hybrid FP8 Training, 102.4TOPS INT4 Inference and Workload-Aware Throttling," IEEE International Solid-State Circuits Conference (ISSCC), 2021; pp. 1-3.

* cited by examiner

*Primary Examiner* — David F Dunphy
(74) *Attorney, Agent, or Firm* — Canon U.S.A., Inc. IP Division (57) ABSTRACT

An information processing apparatus comprises a conversion unit configured to, if a bit width of a weight coefficient in a first layer in weight coefficients in a plurality of layers is N bits, wherein N is a predetermined integer not less than 2, output the weight coefficient, and if the bit width of the weight coefficient is not N bits, output a weight coefficient of N bits obtained by converting the weight coefficient, and an operation unit configured to generate a feature image in a second layer based on a multiply-accumulate operation between the weight coefficient output by the conversion unit and a feature image in the first layer.

11 Claims, 7 Drawing Sheets

CONVOLUTION PROCESSING,
ACTIVATION PROCESSING, ETC.

601 LAYER 1

602 LAYER 2

FIG. 7

INFORMATION PROCESSING APPARATUS, INFORMATION PROCESSING METHOD, AND NON-TRANSITORY COMPUTER-READABLE STORAGE MEDIUM

BACKGROUND OF THE INVENTION

Field of the Invention

The present invention relates to an arithmetic processing technique by a plurality of layers which are hierarchically connected.

Description of the Related Art

A Convolutional Neural Network (CNN) is known as a method used for deep learning. In the CNN, a plurality of layers are hierarchically connected, and a plurality of feature images exist in each layer.

Figure 2:
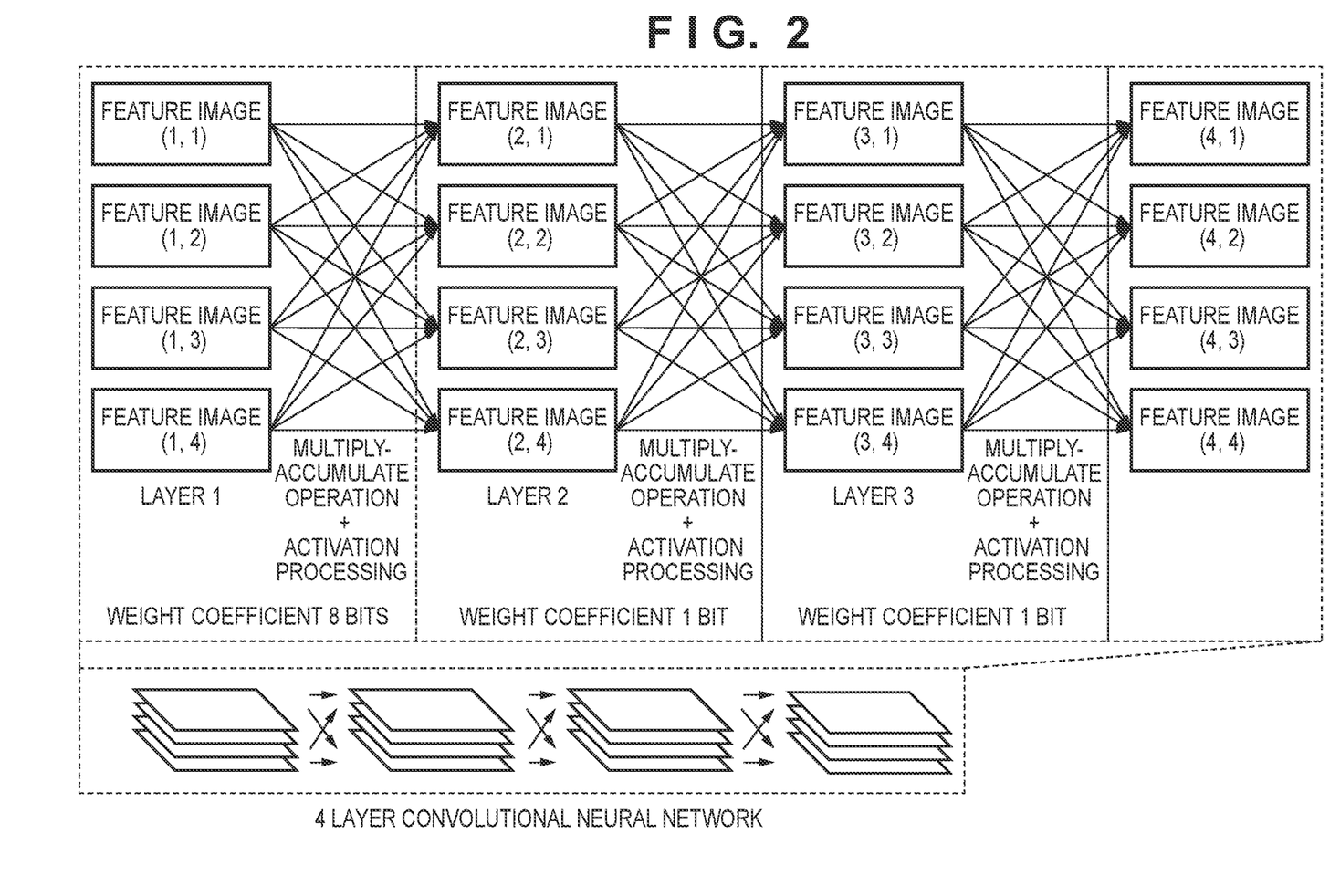
FIG. 2 is a view showing an example of the configuration of a CNN (4-layer convolutional neural network)

FIG. 2 shows an example of the configuration of a CNN (4-layer convolutional neural network) that includes four layers (layers 1 to 4) each including four feature images. In FIG. 2, a feature image (i,j) represents a jth feature image in a layer i. A result of convolutional processing is calculated using a learned filter coefficient (weight coefficient) and the pixels (feature data) of a feature image. Convolutional processing includes multiply-accumulate operations, and includes a plurality of multiplication operations and accumulation operations. Each arrow in FIG. 2 means a multiply-accumulate operation.

A feature image in a current layer is calculated using feature images in a preceding layer and a weight coefficient corresponding to the preceding layer. To calculate one feature image in the current layer, information of a plurality of feature images in the preceding layer is necessary. The formula of the multiply-accumulate operation is as follows.

$$O_{i,j}(n) = \sum_{m=1}^{M} \sum_{x=0}^{X-1} \sum_{y=0}^{Y-1} \left( I_{i-\frac{X-1}{2}+x, j-\frac{Y-1}{2}+y}(m) \times C_{x,y}(m, n) \right) \quad (1)$$

$$O_{i,j}(n) = \sum_{m=1}^{M} \sum_{x=0}^{X-1} \sum_{y=0}^{Y-1} \left( I_{i-\frac{X-1}{2}+x, j-\frac{Y-1}{2}+y}(m) \times C_{x,y}(m, n) \right) \quad (1)$$

Here, $O_{i,j}(n)$ is a variable representing a multiply-accumulate operation result corresponding to the position (i,j) in an nth feature image in the current layer. In equation (1), there are M feature images in the preceding layer, and feature data at the position (i,j) in an mth feature image is expressed as $I_{i,j}(m)$. There are (X×Y) weight coefficients ($C_{0,0}(m,n)$ to $C_{X-1,Y-1}(m,n)$), and the weight coefficient changes depending on the feature image (X and Y are odd numbers). The number of multiply-accumulate operations for calculating the nth feature image in the current layer is (M×X×Y). After the convolutional operation is performed, based on information about the architecture of the CNN, processing such as activation processing or pooling processing is performed using the multiply-accumulate operation result $O_{i,j}(n)$, thereby calculating a feature image in the current layer.

Since the number of multiply-accumulate operations is large, if the CNN is applied to a portable terminal or an incorporated system such as an in-vehicle device, it is necessary to efficiently perform the multiply-accumulate operation and shorten the total processing time. Recently, a network configuration in which the bit width of a feature image, a convolutional processing result, or a weight coefficient changes between layers has received a great deal of attention. If data is quantized, and the bit width is decreased, the operation cost or processing time can be reduced. Ankur Agrawal, et al., "9.1 A 7 nm 4-Core AI Chip with 25.6 TFLOPS Hybrid FP8 Training, 102.4TOPS INT4 Inference and Workload-Aware Throttling," IEEE International Solid-State Circuits Conference (ISSCC), 2021. US-2020-111235 and U.S. Pat. No. 10,474,430 each proposes As compared to a conventional network that holds feature data and weight coefficients as real numbers, in the architecture of a network in which feature data or weight coefficients are quantized, processing can be performed at a low operation cost. However, to perform multiply-accumulate operations of a plurality of types of bit widths, a plurality of types of arithmetic units are necessary.

In the method described in US-2020-111235, feature images of different bit widths are processed by a common arithmetic unit. The parallelism of convolutional processing changes depending on the bit width of a feature image, and the processing time of a weight coefficient with a small bit width can be reduced. In the method described in US-2020-111235, however, if a network architecture in which the bit widths of weight coefficients are different is processed, the efficiency may be lower.

In the method described in Ankur Agrawal, et al., "9.1 A 7 nm 4-Core AI Chip with 25.6 TFLOPS Hybrid FP8 Training, 102.4TOPS INT4 Inference and Workload-Aware Throttling," IEEE International Solid-State Circuits Conference (ISSCC), 2021, a CNN in which the bit width changes between layers can be processed using different types of arithmetic units. By separating arithmetic units dedicated for real number data and arithmetic units dedicated for integer data, the power efficiency of integer data processing can be improved. Weight coefficients and feature data of 4-bit integers and 2-bit integers can be processed by different arithmetic cores.

In the method described in U.S. Pat. No. 10,474,430, weight coefficients of different bit widths are processed by different arithmetic units. Since convolutional processing is performed in accordance with the bit width of a weight coefficient, the processing time and power consumption can be reduced. However, in the method described in Ankur Agrawal, et al., "9.1 A 7 nm 4-Core AI Chip with 25.6 TFLOPS Hybrid FP8 Training, 102.4TOPS INT4 Inference and Workload-Aware Throttling,". IEEE International Solid-State Circuits Conference (ISSCC), 2021 or the method described in U.S. Pat. No. 10,474,430, since the number of arithmetic units is proportional to the number of types of bit widths, the circuit scale may be large.

SUMMARY OF THE INVENTION

The present invention provides a technique for implementing multiply-accumulate operations using weight coefficients of different bit widths by a simpler configuration.

According to the first aspect of the present invention, there is provided an information processing apparatus comprising: a conversion unit configured to, if a bit width of a weight coefficient in a first layer in weight coefficients in a plurality of layers is N bits, wherein N is a predetermined integer not less than 2, output the weight coefficient, and if the bit width of the weight coefficient is not N bits, output a weight coefficient of N bits obtained by converting the weight coefficient; and an operation unit configured to generate a feature image in a second layer based on a multiply-accumulate operation between the weight coefficient output by the conversion unit and a feature image in the first layer.

According to the second aspect of the present invention, there is provided an information processing method performed by an information processing apparatus, comprising: if a bit width of a weight coefficient in a first layer in weight coefficients in a plurality of layers is N bits, wherein N is a predetermined integer not less than 2, outputting the weight coefficient, and if the bit width of the weight coefficient is not N bits, outputting a weight coefficient of N bits obtained by converting the weight coefficient; and generating a feature image in a second layer based on a multiply-accumulate operation between the output weight coefficient and a feature image in the first layer.

According to the third aspect of the present invention, there is provided a non-transitory computer-readable storage medium storing a computer program configured to cause a computer to function as: a conversion unit configured to, if a bit width of a weight coefficient in a first layer in weight coefficients in a plurality of layers is N bits, wherein N is a predetermined integer not less than 2, output the weight coefficient, and if the bit width of the weight coefficient is not N bits, output a weight coefficient of N bits obtained by converting the weight coefficient; and an operation unit configured to generate a feature image in a second layer based on a multiply-accumulate operation between the weight coefficient output by the conversion unit and a feature image in the first layer.

Further features of the present invention will become apparent from the following description of embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Each of the embodiments of the present invention described below can be implemented solely or as a combination of a plurality of the embodiments or features thereof where necessary or where the combination of elements or features from individual embodiments in a single embodiment is beneficial. Furthermore, in the attached drawings, the same reference numerals are given to the same or similar configurations, and redundant description thereof is omitted.

First Embodiment

An example of the hardware configuration of an information processing apparatus according to this embodiment will be described first with reference to the block diagram of FIG. 3. To the information processing apparatus having the hardware configuration example shown in FIG. 3, for example, a computer apparatus such as a Personal Computer (PC), a smartphone, or a tablet terminal apparatus is applicable. Also, the information processing apparatus according to this embodiment may be applied as, for example, an incorporated apparatus incorporated in an image capturing apparatus or an apparatus including the image capturing apparatus.

An input unit 301 is a user interface such as a keyboard, a mouse, or a touch panel. A user can input various kinds of instructions to a CPU 306 by operating the input unit 301.

A storage unit 302 is a nonvolatile memory device, and is, for example, a hard disk, a flexible disk, a CD-ROM, a CD-R, a DVD, a memory card, a CF card, a smart medium, a memory stick, an xD picture card, a USB memory, or the like. For example, the storage unit 302 stores an Operating System (OS), computer programs configured to cause the CPU 306 to execute or control each process to be described as processing to be performed by the information processing apparatus, data, and the like.

A communication unit 303 performs data communication with an external apparatus via a wired and/or wireless network. A display unit 304 includes a liquid crystal screen or a touch panel screen, and can display a processing result by the CPU 306 as an image or characters. Note that the display unit 304 may be a projection apparatus such as a projector configured to project an image or characters.

A convolutional processing unit 305 performs an operation (an operation including a multiply-accumulate operation) in each layer of a CNN including a plurality of layers, thereby obtaining an output (an output result of the CNN) corresponding to an input to the CNN. For example, the convolutional processing unit 305 performs an operation in each layer of the CNN to which an input image (for example, an image of each frame of a moving image, or a periodically or non-periodically captured still image) stored in a RAM 308 is input, thereby obtaining an output corresponding to the input. The convolutional processing unit 305 then stores the obtained output result of the CNN in the RAM 308 or the storage unit 302.

Based on the output result of the CNN stored in the RAM 308 or the storage unit 302 by the convolutional processing unit 305, the CPU 306 performs processing such as image processing or image recognition for the input image, and stores the result of the processing in the RAM 308 or the storage unit 302. Note that the communication unit 303 may transmit, to an external apparatus, the output result obtained by the convolutional processing unit 305 or the result of the processing by the CPU 306.

Also, the result of image processing or image recognition by the CPU 306 may be displayed as an image or characters on the display unit 304. If the information processing apparatus has a voice output function, the result may be output as a voice.

The CPU 306 executes various kinds of processing using computer programs and data stored in a ROM 307 or the RAM 308, thereby executing or controlling various kinds of processing to be described as processing to be performed by the information processing apparatus.

The ROM 307 stores setting data of the information processing apparatus, computer programs and data associated with activation of the information processing apparatus, and computer programs and data associated with the basic operation of the information processing apparatus.

The RAM 308 includes an area used to store computer programs and data loaded from the storage unit 302 or the ROM 307, and an area used to store computer programs and data received from an external apparatus via the communication unit 303. The RAM 308 also includes a work area used by each of the CPU 306, the convolutional processing unit 305, and an image processing unit 309 when executing various kinds of processing. The RAM 308 can thus appropriately provide various kinds of areas.

The image processing unit 309 receives a command from the CPU 306, reads out an image stored in the storage unit 302, performs range adjustment of pixel values, and writes the image that has undergone the range adjustment to the RAM 308.

The input unit 301, the storage unit 302, the communication unit 303, the display unit 304, the convolutional processing unit 305, the CPU 306, the ROM 307, the RAM 308, and the image processing unit 309 are connected to a system bus 310.

Figure 3:
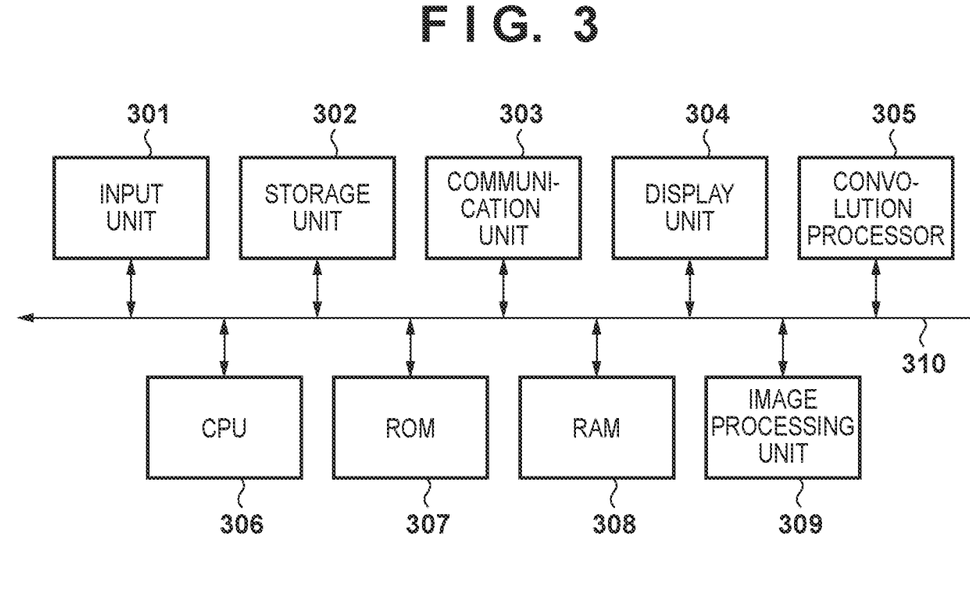
FIG. 3 is a block diagram showing an example of the hardware configuration of an information processing apparatus.

Note that the hardware configuration shown in FIG. 3 is an example of a hardware configuration applicable to the information processing apparatus according to this embodiment, and changes and modifications can be made as needed. For example, in FIG. 3, the information processing apparatus includes all the input unit 301, the storage unit 302, the display unit 304, the convolutional processing unit 305, and the image processing unit 309. One or more of these units may be provided as an external apparatus of the information processing apparatus, and in this case, data communication with the external apparatus is performed by the communication unit 303.

Also, for example, some of the areas provided by the RAM 308 may be provided by the storage unit 302. A part or whole of information to be described as information stored in the RAM 308 or the storage unit 302 may be stored in an external apparatus. In this case, data communication with the external apparatus is performed by the communication unit 303.

Also, for example, in FIG. 3, the information processing apparatus includes one CPU (CPU 306). However, the information processing apparatus may include a plurality of CPUs. Additionally, the function of the information processing apparatus according to this embodiment may be implemented by a plurality of apparatuses performing a cooperative operation.

The convolutional processing unit 305 or the image processing unit 309 may be implemented as hardware or may be implemented as a computer program. In the latter case, the computer program is stored in the storage unit 302, and the CPU 306 reads out the computer program to the RAM 308 and executes it, thereby implementing the function of the convolutional processing unit 305 or the image processing unit 309.

FIG. 2 shows an example of the configuration of the CNN used in this embodiment. Details of the CNN shown in FIG. 2 are as described above. Note that information (architecture information) about the architecture of the CNN includes the information of layers (the connection relationship between the layers, the filter architecture, the bit widths of weight coefficients, and the sizes, bit widths, and number of feature images), and is stored in the storage unit 302 or the like.

The number of layers of the CNN shown in FIG. 2 is four (layers 1 to 4), and four feature images exist in each layer. As described above, a feature image (i,j) represents a jth feature image in a layer i. Weight coefficients in all layers do not have the same bit width. In FIG. 2, the bit width of the weight coefficient in layer 1 is 8 bits, the bit width of the weight coefficient in layer 2 is 1 bit, and the bit width of the weight coefficient in layer 3 is 1 bit. A feature image has a plurality of pixels (feature data).

Calculation (generation) of feature images in each of layers 2 to 4 in a conventional technique will be described here. Feature images (1, 1), (1, 2), (1, 3), and (1, 4) in layer 1 are, for example, input images or the feature images of the input images.

Using the feature images (1, 1), (1, 2), (1, 3), and (1, 4) in layer 1 and the weight coefficient of 8 bits, a multiply-accumulate operations (convolutional processing) according to equation (1) described above are performed. From the result of the multiply-accumulate operations, feature images (2, 1), (2, 2), (2, 3), and (2, 4) in layer 2 are generated.

Using the feature images (2, 1), (2, 2), (2, 3), and (2, 4) in layer 2 and the weight coefficient of 1 bit, a multiply-accumulate operations (convolutional processing) according to equation (1) described above are performed. From the result of the multiply-accumulate operation, feature images (3, 1), (3, 2), (3, 3), and (3, 4) in layer 3 are generated.

Using the feature images (3, 1), (3, 2), (3, 3), and (3, 4) in layer 3 and the weight coefficient of 1 bit, a multiply-accumulate operations (convolutional processing) according to equation (1) described above are performed. From the result of the multiply-accumulate operation, feature images (4, 1), (4, 2), (4, 3), and (4, 4) in layer 4 are generated.

Figure 6:
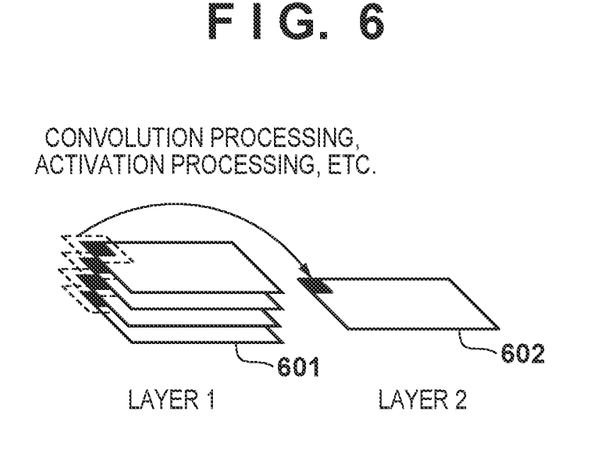
FIG. 6 is a view for explaining generation of a feature image.

For example, as shown in FIG. 6, feature data at the same position are extracted from four feature images 601 in layer 1. After convolutional processing is performed using the feature data, processing such as activation processing is performed, and the result of the processing is obtained as feature data at the position in a feature image 602 in layer 2.

In the conventional technique, if there exist one or more weight coefficients whose bit widths are different from other weight coefficients, processing is complex because, for example, a multiplier that performs a multiply-accumulate operation is selected from a plurality of types of multipliers in accordance with the bit widths of the weight coefficients. Also, in a conventional technique, if there exist one or more weight coefficients whose bit widths are different from other weight coefficients, a plurality of types of multipliers need to be prepared in advance in accordance with the bit widths of the weight coefficients. As a result, the circuit scale becomes large, and various problems occur in terms of cost or the like.

On the other hand, in this embodiment, if the bit width of a weight coefficient is N (N is an integer not less than 2) bits, the weight coefficient is set to the target of a multiply-accumulate operation. If the bit width of the weight coefficient is not N bits, a weight coefficient of N bits obtained by converting the weight coefficient is set to the target of a multiply-accumulate operation.

Figure 4:
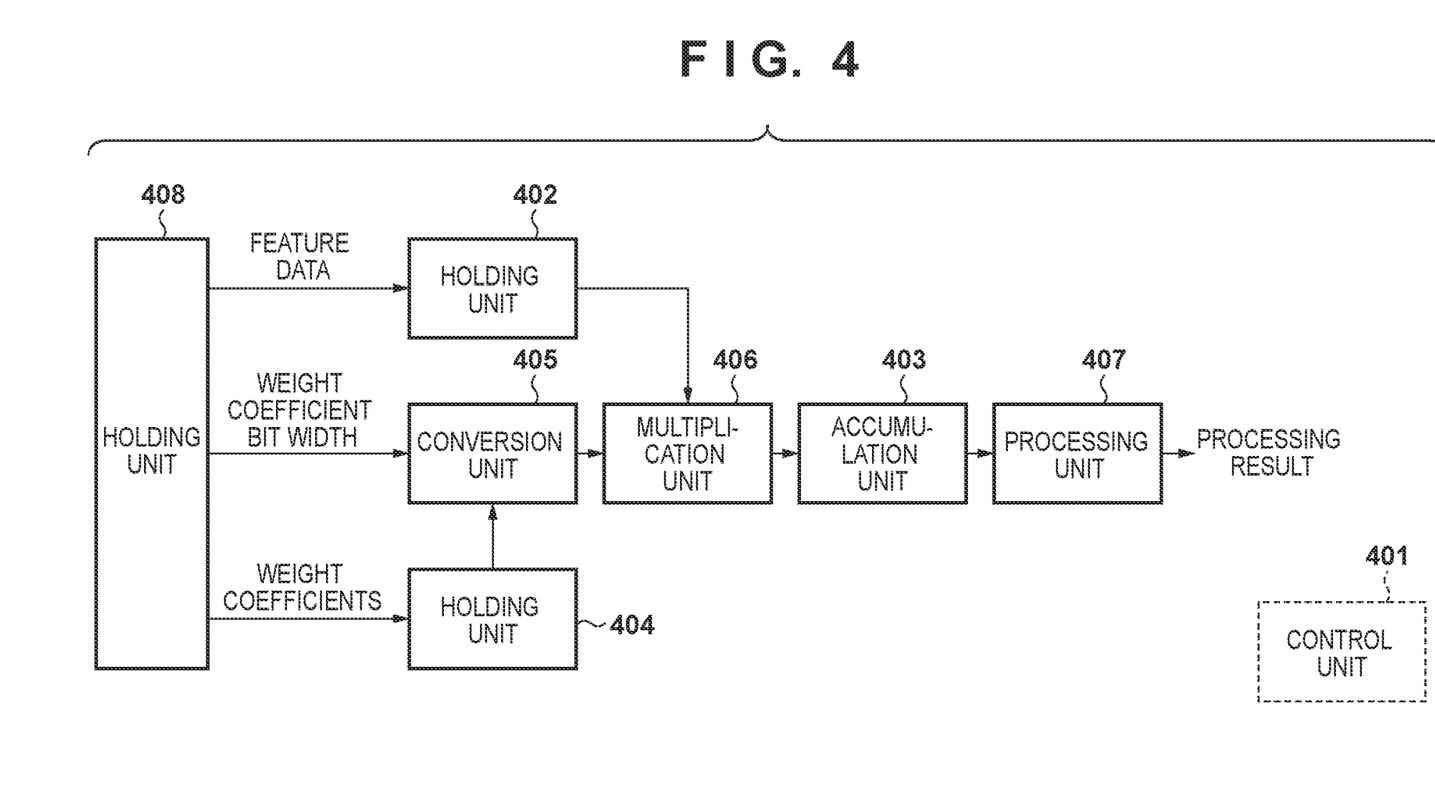
FIG. 4 is a block diagram showing an example of the functional configuration of the convolutional processing unit 305.

FIG. 4 is a block diagram showing an example of the functional configuration of the convolutional processing unit 305. The operation of the convolutional processing unit 305 having the functional configuration example will be described with reference to the flowchart of FIG. 1.

Figure 1:
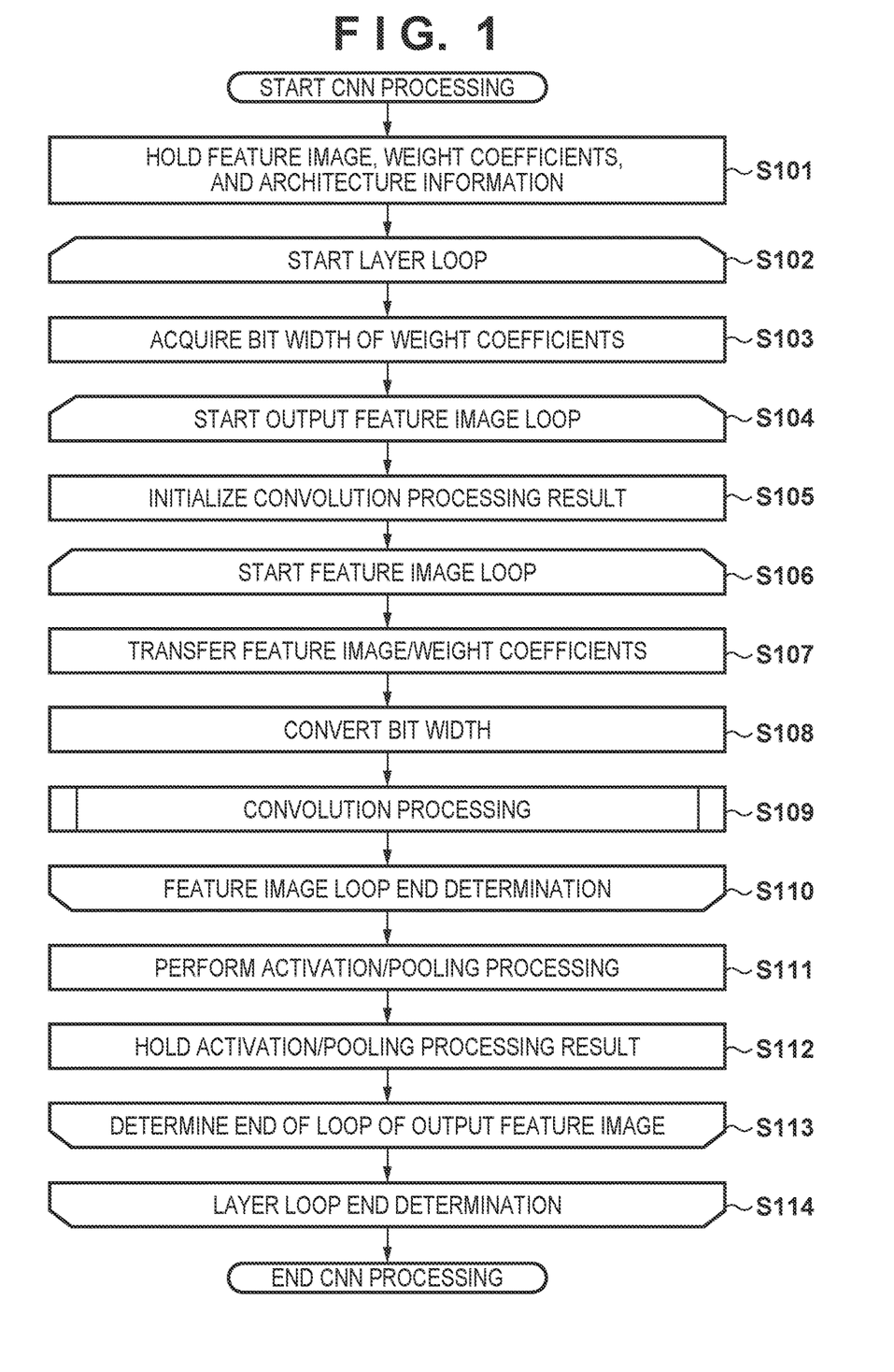
FIG. 1 is a flowchart showing the operation of a convolutional processing unit 305.

In step S101, a control unit 401 reads out "a plurality of feature images in layer 1", "architecture information", and "weight coefficients corresponding to layers", which are stored in the storage unit 302. The control unit 401 then stores, in a holding unit 408, "the plurality of feature images in layer 1", "architecture information", and "weight coefficients corresponding to layers" read out. Here, the feature images in layer 1 are, for example, input images or the feature images of the input images.

Then, the processes of steps S102 to S114 are performed for each layer of the CNN. In this embodiment, layer 1, layer 2, and layer 3 are target layers, and the processes of steps S102 to S114 are performed for the target layers. More specifically, the processes of steps S102 to S114 are first performed for layer 1, the processes of steps S102 to S114 are performed for layer 2 next, and the processes of steps S102 to S114 are finally performed for layer 3.

In step S103, the control unit 401 acquires the bit width of a weight coefficient corresponding to the target layer from the architecture information. The bit width of a weight coefficient in each layer is set in advance and registered in the architecture information. Various setting methods can be applied to the bit width of a weight coefficient.

For example, the control unit 401 may set the bit widths of weight coefficients in the same layer to the same bit width, as shown in FIG. 2, or may set a different bit width for each output feature image (a feature image in the layer next to the target layer). If output feature images are divided into a plurality of groups, the control unit 401 sets the bit width of a weight coefficient for each group, and performs parallel processing on a group basis, thereby improving processing efficiency.

The processes of steps S104 to S113 are performed for each output feature image to be generated. In step S105, the control unit 401 initializes a convolutional processing result held in an accumulation unit 403 to 0. Then, the processes of steps S106 to S110 are performed for each feature image in the target layer.

In step S107, the control unit 401 reads out a feature image (a set of feature data) in the target layer from the holding unit 408, and stores (transfers) the readout feature image in (to) a holding unit 402. Also, the control unit 401 reads out a weight coefficient corresponding to the target layer from the holding unit 408, and stores (transfers) the readout weight coefficient in (to) a holding unit 404.

In step S108, a conversion unit 405 receives a control signal from the control unit 401, and determines whether the bit width of the weight coefficient stored in the holding unit 404 in step S107 is N (N is an integer not less than 2) bits. In this embodiment, N=8.

As the result of the determination, if the bit width of the weight coefficient stored in the holding unit 404 in step S107 is not 8 bits, the conversion unit 405 converts the weight coefficient into a weight coefficient having a bit width of 8 bits. A case where the bit width of the weight coefficient stored in the holding unit 404 in step S107 is 1 bit will be described here.

If the bit width of the weight coefficient stored in the holding unit 404 in step S107 is 1 bit, the value of the weight coefficient is 0 or 1, and it is therefore impossible to express a negative number. If a weight coefficient whose value is 0 or 1 is used, it is difficult to improve recognition accuracy, and therefore, a weight coefficient whose value is −1 or 1 is used in many cases. Hence, before convolutional processing is performed, the conversion unit 405 converts a weight coefficient $C_{x,y}(m,n)$ of 1 bit into a weight coefficient $C'_{x,y}(m,n)$ in accordance with equation (2) below.

$$C'_{x,y}(m, n) = \begin{cases} -1, & C_{x,y}(m, n) = 0 \\ 1, & C_{x,y}(m, n) = 1 \end{cases} \quad (2)$$

By this conversion, a weight coefficient having a value of "0" is converted into a weight coefficient having a value of "−1", and a weight coefficient having a value of "1" is converted into a weight coefficient having a value of "1". The conversion unit 405 then converts the weight coefficient whose value is converted in accordance with equation (2) into a weight coefficient having a bit width of 8 bits (extends the bit width to 8 bits). That is, if the value of the weight coefficient is expressed by a binary number, conversion indicated by equation (3) below is performed.

$$C'_{x,y}(m, n) = \begin{cases} (11111111)_2, & C_{x,y}(m, n) = (0)_2 \\ (00000000)_2, & C_{x,y}(m, n) = (1)_2 \end{cases} \quad (3)$$

The weight coefficient before conversion has a bit width of 1 bit, and no sign bit is added. The weight coefficient after conversion has a bit width of 8 bits, and a sign bit is added. The weight coefficient is expressed by a 2's complement. By this processing, a weight coefficient of 8 bits can be obtained from the weight coefficient of 1 bit, and the conversion unit 405 outputs the weight coefficient of 8 bits to a multiplication unit 406.

On the other hand, as the result of the determination, if the bit width of the weight coefficient stored in the holding unit 404 in step S107 is 8 bits, the conversion unit 405 outputs the weight coefficient to the multiplication unit 406.

Figure 7:
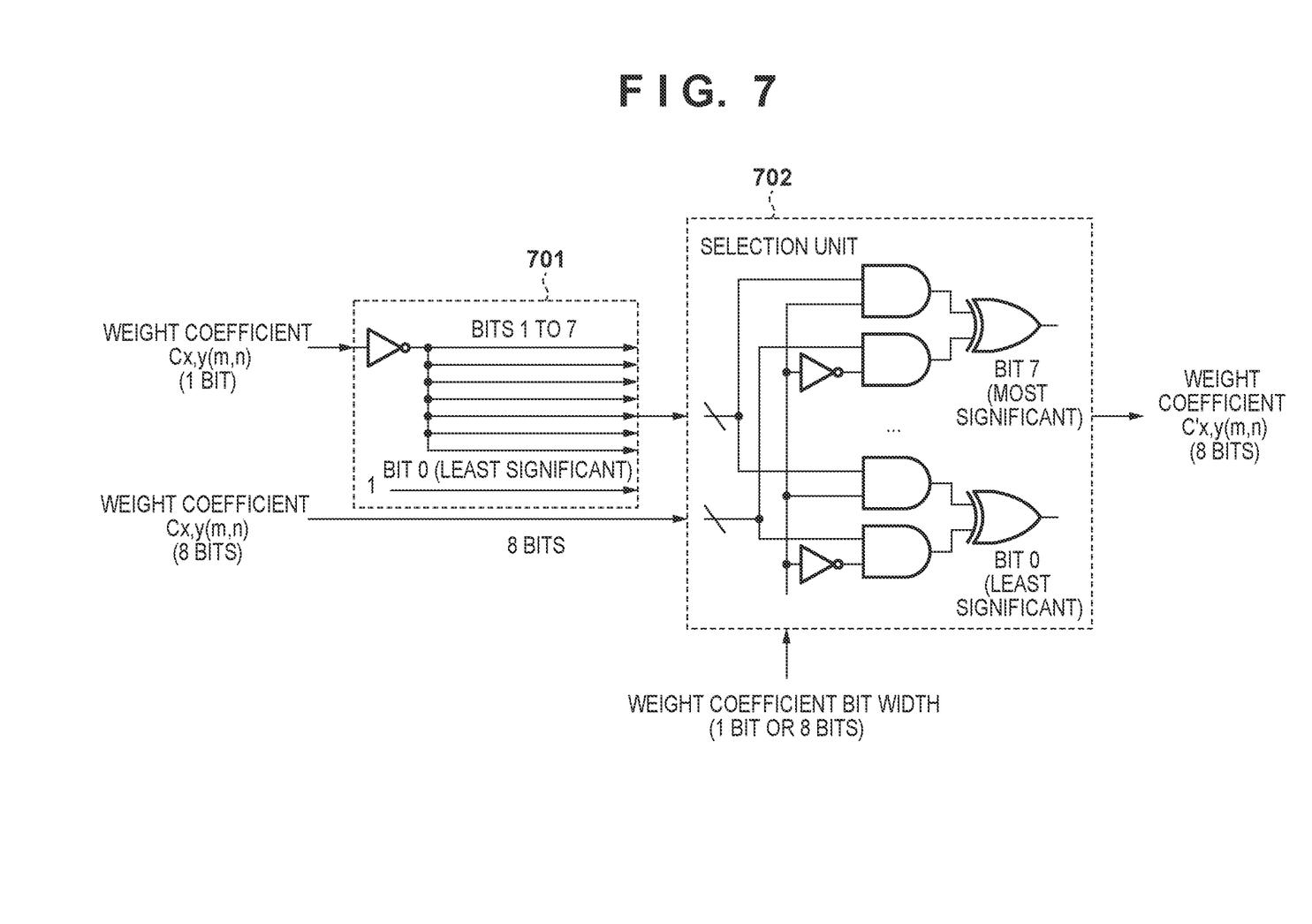
FIG. 7 is a block diagram showing an example of the functional configuration of a conversion unit 405.

An example of the functional configuration of the conversion unit 405 will be described here with reference to the block diagram of FIG. 7. If the weight coefficient $C_{x,y}(m,n)$ of 1 bit is input to the conversion unit 405, the weight coefficient $C_{x,y}(m,n)$ of 1 bit is input to an inverter circuit 701. The inverter circuit 701 converts the weight coefficient $C_{x,y}(m,n)$ before conversion into the weight coefficient $C'_{x,y}(m,n)$ of 8 bits. The least significant bit of the weight coefficient of 8 bits (N bits in general) after conversion is always 1, and all the remaining seven bits ((N-1) bits in general) have a value inverted with respect to the weight coefficient of 1 bit before conversion. The inverter circuit 701 then inputs the converted weight coefficient of 8 bits to a selection unit 702.

On the other hand, if the weight coefficient $C_{x,y}(m,n)$ of 8 bits is input to the conversion unit 405, the weight coefficient $C_{x,y}(m,n)$ of 8 bits is input as the weight coefficient $C'_{x,y}(m,n)$ of 8 bits to the selection unit 702 (without interposing the inverter circuit 701).

Upon receiving the weight coefficient from the inverter circuit 701, the selection unit 702 selects the weight coefficient and outputs the selected weight coefficient to the multiplication unit 406. On the other hand, upon receiving the weight coefficient without interposing the inverter circuit 701, the selection unit 702 selects the weight coefficient and outputs the selected weight coefficient to the multiplication unit 406. Unlike normal bit extension, if the weight coefficient of 1 bit is 0, the value is converted. If the weight coefficient of 1 bit is 1, the value is directly output. Hence, the least significant bit is fixed to 1 without using the input signal. By the configuration of the conversion unit 405, conversion of the value and extension of the bit width can simultaneously be implemented by the simple circuit.

In step S109, the multiplication unit 406 and the accumulation unit 403 perform multiply-accumulate operation processing (convolutional processing) according to equation (4) below using the feature images in the target layer and the weight coefficient that the multiplication unit 406 acquires from the conversion unit 405

$$O_{i,j}(n) = \sum_{m=1}^{M} \sum_{x=0}^{X-1} \sum_{y=0}^{Y-1} \left( I_{i,\frac{X-1}{2}+x, j-\frac{Y-1}{2}+y}(m) \times C'_{x,y}(m, n) \right) \quad (4)$$

Here, $O_{i,j}(n)$ is a variable representing a multiply-accumulate operation result corresponding to a position (i,j) in an nth feature image in the layer next to the target layer. Also, there are M feature images in the target layer, and feature data at the position (i,j) in an mth feature image is expressed as $I_{i,j}(m)$. Equation (4) shows the multiply-accumulate operation between all feature images in the target layer and the weight coefficient. When the process of step S109 is performed for all feature images in the target layer, the multiply-accumulate operation of equation (4) is implemented.

The multiplication unit 406 performs multiplication processing between a feature image in the target layer and the weight coefficient that the multiplication unit 406 acquires from the conversion unit 405, and the accumulation unit 403 cumulatively adds the multiplication result by the multiplication unit 406.

According to this embodiment, regardless of whether the bit width of the weight coefficient before conversion is 8 bits or 1 bit, the multiply-accumulate operation using the weight coefficient of 8 bits is performed. Hence, the processing can be performed by the common multiplication unit 406 and the accumulation unit 403. The multiplication unit 406 can process a weight coefficient with a sign bit. If the weight coefficient of 8 bits and the weight coefficient of 1 bit are processed with the same parallelism, any arithmetic unit need not be added.

If the parallelism of the processing of the weight coefficient of 1 bit increases, the circuit of the accumulation unit 403 that accumulates a multiplication result may increase, and power consumption may increase. Hence, in an apparatus that does not need speed-up but demands low power consumption, it is preferable not to increase the parallelism of the processing of the weight coefficient of 1 bit. According to this embodiment, the parallelism is kept constant in processing of the weight coefficient of 1 bit and processing of the weight coefficient of 8 bits, thereby obtaining the effect of reducing the circuit scale and saving power.

In step S111, a processing unit 407 receives a control signal from the control unit 401, and performs activation processing according to equation (5) below based on the result of convolutional processing by the multiplication unit 406 and the accumulation unit 403, which is obtained for one output feature image.

$$f(x) = \begin{cases} 0, & x < 0 \\ x, & x \geq 0 \end{cases} \quad (5)$$

Here, f(x) is an activation function, and x is the result of convolutional processing by the multiplication unit 406 and the accumulation unit 403. In this example, the activation function is implemented using a Rectified Linear Unit (ReLU). However, the activation function may be implemented using not the ReLU but another nonlinear function or a quantization function. The processing unit 407 then generates an output feature image by performing pooling processing based on the result of the activation processing and adjusts the size of the output feature image as needed. In step S112, the control unit 401 stores, in the holding unit 408, the output feature image generated in step S111 as a feature image in the layer next to the target layer.

As described above, according to this embodiment, a weight coefficient of 1 bit is converted into a weight coefficient of 8 bits. It is therefore possible to process weight coefficients of different bit widths (1 bit or 8 bits) by a common arithmetic unit (the multiplication unit and the accumulation unit) and reduce the circuit scale. When performing convolutional processing of a weight coefficient of 1 bit, multiplication of the weight coefficient of 1 bit may be replaced with addition and subtraction. However, since the 8-bit multiplication unit configured to process the multiplication of the weight coefficient of 8 bits already exists, the circuit scale can be made small by using the bit width conversion unit and the 8-bit multiplication unit instead of providing an addition unit anew.

Second Embodiment

Figure 5:
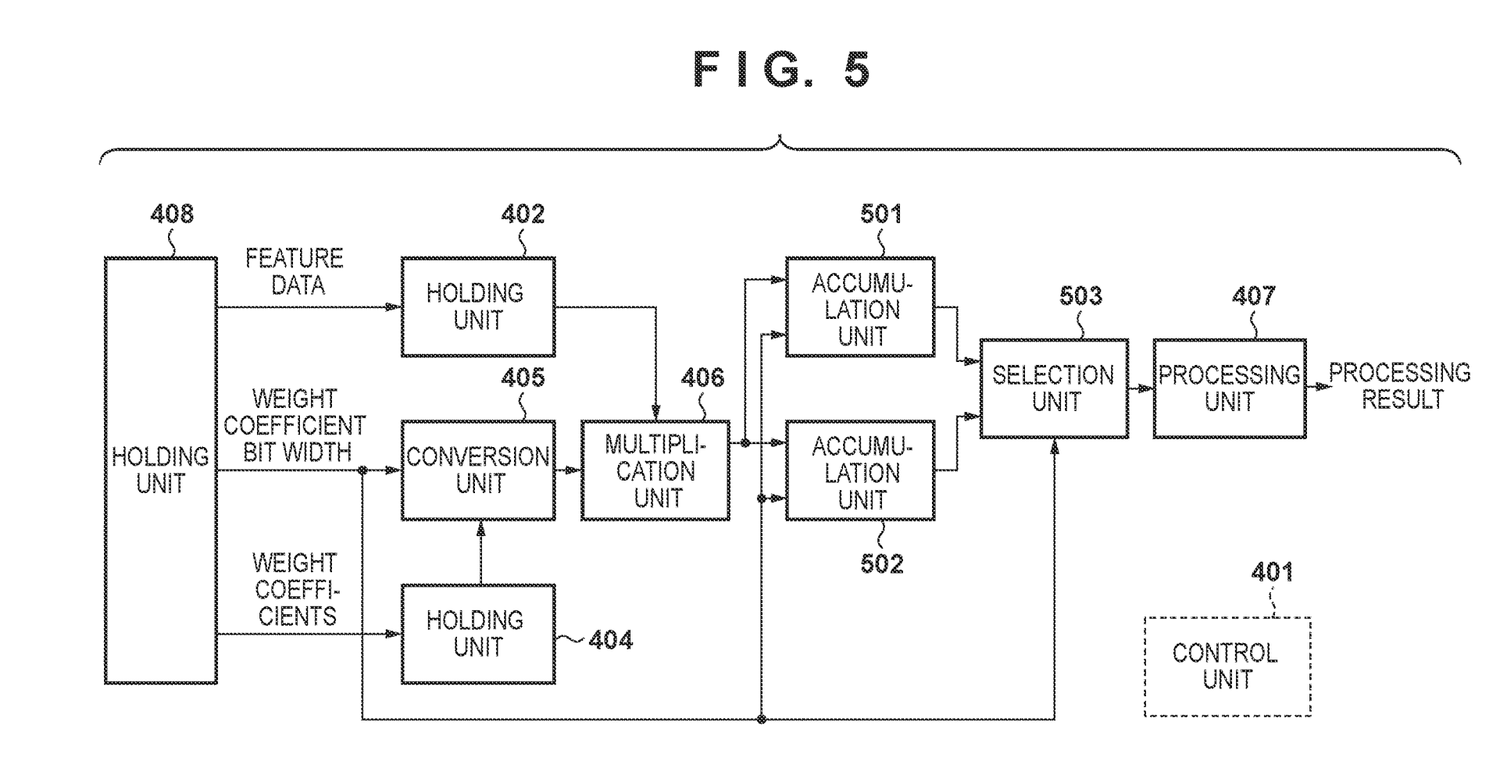
FIG. 5 is a block diagram showing an example of the functional configuration of a convolutional processing unit 305.

Hereinafter, the difference from the first embodiment will be described, and the second embodiment is assumed to be the same as the first embodiment, unless it is specifically stated otherwise. FIG. 5 is a block diagram showing an example of the functional configuration of a convolutional processing unit 305 according to this embodiment. The same reference numerals as those of the function units shown in FIG. 4 denote the same function units in FIG. 5, and a description of the function units will be omitted.

An accumulation unit 502 has a smaller circuit scale and a higher processing speed as compared to an accumulation unit 501. When the accumulation unit 502 is used, power consumption is reduced because the processing time is shorter than in a case where the accumulation unit 501 is used.

In the flowchart of FIG. 1, the operation of the convolutional processing unit 305 according to this embodiment is different from the first embodiment in the following point. In step S109, a multiplication unit 406 performs multiplication processing between a feature image in a target layer and a weight coefficient that the multiplication unit 406 acquires from a conversion unit 405. If the weight coefficient is "a weight coefficient input to the multiplication unit 406 without interposing an inverter circuit 701 (a weight coefficient whose original bit width is 8 bits)", (to be referred to as a weight coefficient A), a control unit 401 inputs the result of the multiplication processing to the accumulation unit 502. On the other hand, if the weight coefficient is "a weight coefficient converted into 8 bits by the inverter circuit 701 (a weight coefficient whose original bit width is 1 bit)", (to be referred to as a weight coefficient B), the control unit 401 inputs the result of the multiplication processing to the accumulation unit 501.

If the bit width of each of the feature image and the weight coefficient is 8 bits, the multiplication result of the feature image and the weight coefficient is 16 bits. Here, if the weight coefficient is the weight coefficient A, the multiplication result of 16 bits is the target of accumulation. If the weight coefficient is the weight coefficient B, 9 bits of the multiplication result of 16 bits are the target of accumulation. Hence, the result of the multiplication processing using the weight coefficient A is input to the accumulation unit 502 having a capability (capability in the viewpoint of the operation or power) higher than the accumulation unit 501 that cumulatively adds the result of the multiplication processing using the weight coefficient B. On the other hand, the result of the multiplication processing using the weight coefficient B is input to the accumulation unit 501 having a capability (capability in the viewpoint of the operation or power) lower than the accumulation unit 502 that cumulatively adds the result of the multiplication processing using the weight coefficient A.

Both the accumulation unit 501 and the accumulation unit 502 cumulatively add the multiplication result by the multiplication unit 406. Thus, in this embodiment, the accumulation unit is switched in accordance with the bit width of the weight coefficient (or the bit width before conversion if it is converted).

If the accumulation unit 501 performs accumulation, a selection unit 503 acquires (selects) the result of the accumulation by the accumulation unit 501 and inputs the acquired result of the accumulation to a processing unit 407. If the accumulation unit 502 performs accumulation, the selection unit 503 acquires (selects) the result of the accumulation by the accumulation unit 502 and inputs the acquired result of the accumulation to the processing unit 407.

Thus, according to this embodiment, using the common multiplication unit and the plurality of accumulation units, the accumulation unit is selected in accordance with the bit width of the weight coefficient, thereby reducing the processing time and the power consumption.

Third Embodiment

In the above-described embodiments, an example of application to a CNN of a two-dimensional image has been described. However, application to a CNN of one-dimensional voice data or arbitrary data with three or more dimensions is also possible. In the above-described embodiments, a CNN that performs image processing has been described as an example. The above-described embodiments can also be applied to a CNN that performs another processing such as voice recognition.

In the above-described embodiments, in step S108, the value of a weight coefficient having a bit width of 1 bit is converted in accordance with equation (2) or (3), and the converted value is extended to 8 bits. However, the bit width may be extended to 8 bits without converting the value of the weight coefficient having a bit width of 1 bit. Alternatively, sign extension of 8 bits may be performed without converting the value. That is, a conversion unit 405 may not have the function of converting the value of the weight coefficient.

Also, in the above-described embodiments, a case where a CNN including a weight coefficient having a bit width of 1 bit and a weight coefficient having a bit width of 8 bits is used has been described. The above-described embodiments can similarly be applied to a case where a CNN including a weight coefficient having an arbitrary bit width is used. In addition, the value of the weight coefficient having an arbitrary bit width being less than a predetermined bits may be converted and extended to the predetermined bits.

Also, in the above-described embodiments, a case where extension to the bit width (for example, the largest bit width) of a certain weight coefficient in the layers is performed has been described. However, the bit width to extend is not limited to the bit width of a certain weight coefficient, and an arbitrary bit width may be used. Furthermore, in the above-described embodiments, a case where a CNN is used has been described. However, an arbitrary hierarchical neural network other than a CNN may be used.

The numerical values, the processing timings, the processing orders, the main constituents of processing, the data (information) acquisition methods/transmission destinations/transmission sources/storage locations used in each embodiment described above are merely examples for a detailed explanation, and are not intended to be limited to the example.

Some or all of the above-described embodiments may be combined as needed. Some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to the embodiments above, it is to be understood that the invention is not limited to the disclosed embodiments. The scope of the following claims is to be accorded the broadest interpretation so as to encompass all such modifications and equivalent architectures and functions obvious to the skilled person in light of their common general knowledge.

This application claims the benefit of Japanese Patent Application No. 2022-129651, filed Aug. 16, 2022, which is hereby incorporated by reference herein in its entirety.

What is claimed is:

1. An information processing apparatus comprising:
a conversion unit configured to, if a bit width of a weight coefficient in a first layer in weight coefficients in a plurality of layers is N bits, wherein N is a predetermined integer not less than 2, output the weight coefficient, and if the bit width of the weight coefficient is not N bits, output a weight coefficient of N bits obtained by converting the weight coefficient; and
an operation unit configured to generate a feature image in a second layer based on a multiply-accumulate operation between the weight coefficient output by the conversion unit and a feature image in the first layer.

2. The apparatus according to claim 1, wherein if the bit width of the weight coefficient in the first layer is 1 bit, the conversion unit outputs a weight coefficient of N bits in which a least significant bit is 1, and all remaining (N-1) bits have a value inverted with respect to the weight coefficient.

3. The apparatus according to claim 1, wherein the conversion unit extends the bit width of the weight coefficient whose bit width is less than N bits to N bits, and outputs the extended weight coefficient.

4. The apparatus according to claim 1, wherein the operation unit generates the feature image in the second layer by performing activation processing and pooling processing for a result of the multiply-accumulate operation between the weight coefficient output by the conversion unit and the feature image in the first layer.

5. The apparatus according to claim 1, wherein
the operation unit comprises:
a multiplication unit configured to perform multiplication between the weight coefficient output by the conversion unit and the feature image in the first layer;
a first accumulation unit configured to perform accumulation of a result of the multiplication by the multiplication unit; and
a second accumulation unit configured to perform accumulation of the result of the multiplication by the multiplication unit, and
the second accumulation unit has a capability higher than the first accumulation unit.

6. The apparatus according to claim 5, wherein if the weight coefficient output by the conversion unit is the weight coefficient obtained by the conversion, the first accumulation unit performs the accumulation of the result of the multiplication by the multiplication unit.

7. The apparatus according to claim 5, wherein if the weight coefficient output by the conversion unit is not the weight coefficient obtained by the conversion, the second accumulation unit performs the accumulation of the result of the multiplication by the multiplication unit.

8. The apparatus according to claim 1, wherein the conversion unit and the operation unit operate for each of the plurality of layers.

9. The apparatus according to claim 1, wherein the bit width of a weight coefficient in each of the plurality of layers is N bits.

10. An information processing method performed by an information processing apparatus, comprising:
if a bit width of a weight coefficient in a first layer in weight coefficients in a plurality of layers is N bits, wherein N is a predetermined integer not less than 2, outputting the weight coefficient, and if the bit width of the weight coefficient is not N bits, outputting a weight coefficient of N bits obtained by converting the weight coefficient; and generating a feature image in a second layer based on a multiply-accumulate operation between the output weight coefficient and a feature image in the first layer.

11. A non-transitory computer-readable storage medium storing a computer program configured to cause a computer to function as:
a conversion unit configured to, if a bit width of a weight coefficient in a first layer in weight coefficients in a plurality of layers is N bits, wherein N is a predetermined integer not less than 2, output the weight coefficient, and if the bit width of the weight coefficient is not N bits, output a weight coefficient of N bits obtained by converting the weight coefficient; and an operation unit configured to generate a feature image in a second layer based on a multiply-accumulate operation between the weight coefficient output by the conversion unit and a feature image in the first layer.

* * * * *